US012749736B2

(12) United States Patent
Schmitt et al.

(10) Patent No.: US 12,749,736 B2
(45) Date of Patent: Sep. 29, 2026

(54) BATTERY HOUSING PART, BATTERY MODULE, AND METHOD FOR PRODUCING A BATTERY HOUSING PART

(71) Applicant: Robert Bosch GmbH, Stuttgart (DE)

(72) Inventors: Markus Schmitt, Tamm (DE); Ralph Glemser, Brackenheim (DE); Silvio Grund, Wurzen (DE); Thomas Kern, Hoerselberg-Hainich (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 17/837,228

(22) Filed: Jun. 10, 2022

(65) Prior Publication Data

US 2022/0399596 A1 Dec. 15, 2022

(30) Foreign Application Priority Data

Jun. 11, 2021 (DE) .................... 10 2021 205 959.7

(51) Int. Cl.
*H01M 10/6568* (2014.01)
*F28F 3/04* (2006.01)
(Continued)

(52) U.S. Cl.
CPC ..... *H01M 10/6568* (2015.04); *H01M 10/613* (2015.04); *H01M 10/655* (2015.04);
(Continued)

(58) Field of Classification Search
CPC .......... H01M 10/6568; H01M 10/613; H01M 2220/20; H01M 50/204; H01M 10/6566; H01M 10/6556
See application file for complete search history.

(56) References Cited

U.S. PATENT DOCUMENTS 10,274,259 B2 * 4/2019 Palanchon .......... H01M 10/625
2017/0176108 A1 * 6/2017 Palanchon ........ H01M 10/6567
(Continued)

FOREIGN PATENT DOCUMENTS

CN 110635193 A * 12/2019 .......... H01M 10/625
DE 102012217868 A1 4/2014
(Continued)

OTHER PUBLICATIONS

Machine translation of Zhu et al. CN-110635193-A. (Year: 2019).*
Machine translation of Pohn WO-2021072466-A1. (Year: 2021).*

*Primary Examiner* — Basia A Ridley
*Assistant Examiner* — Julia Marie Fehr
(74) *Attorney, Agent, or Firm* — Michael Best & Friedrich LLP

(57) ABSTRACT

A battery housing part (11) for a battery housing (10) of a battery module (30) for accommodating battery cells, having a cooling channel (12) with a cooling channel bottom (13), a cooling channel wall (14) for delimiting the cooling channel (12), and flow-disturbing elements (15) for disturbing a coolant flow in the cooling channel (12), the flow-disturbing elements (15) projecting in a height direction (21) in a projection-like manner from the cooling channel bottom (13), and a part of the flow-disturbing elements (15) being designed in the form of normal elements (15*a*) and another part of the flow-disturbing elements (15) being designed in the form of supporting elements (15*b*), the supporting elements (15*b*) being designed to be higher in the height direction (21) than the normal elements (15*a*) in order to support a covering means (19) covering the cooling channel (12).

4 Claims, 4 Drawing Sheets

(51) Int. Cl.

| | |
|---|---|
| ***F28F 13/12*** | (2006.01) |
| ***H01M 10/613*** | (2014.01) |
| ***H01M 10/655*** | (2014.01) |
| ***H01M 10/6556*** | (2014.01) |
| ***H01M 50/204*** | (2021.01) |

(52) U.S. Cl.

CPC ..... *H01M 10/6556* (2015.04); *H01M 50/204* (2021.01); *F28F 3/044* (2013.01); *F28F 13/12* (2013.01); *H01M 2220/20* (2013.01)

(56) References Cited

U.S. PATENT DOCUMENTS

| | | | | |
|---|---|---|---|---|
| 2020/0106144 | A1* | 4/2020 | Schmitt | F28F 3/04 |
| 2020/0176838 | A1* | 6/2020 | Kopp | H01M 10/613 |
| 2022/0285759 | A1* | 9/2022 | Kim | H01M 10/6567 |

FOREIGN PATENT DOCUMENTS

| | | | | |
|---|---|---|---|---|
| DE | 112015002995 | T5 | 3/2017 | |
| DE | 112015003350 | T5 | 4/2017 | |
| DE | 102018220937 | A1 | 6/2020 | |
| DE | 102018220939 | A1 | 6/2020 | |
| DE | 102019205388 | A1 | 10/2020 | |
| WO | WO-2021072466 | A1 * | 4/2021 | H01M 10/6556 |

* cited by examiner

BATTERY HOUSING PART, BATTERY MODULE, AND METHOD FOR PRODUCING A BATTERY HOUSING PART

BACKGROUND

The present invention relates to a battery housing part for a battery housing of a battery module for accommodating battery cells, having a cooling channel with a cooling channel bottom, a cooling channel wall for delimiting the cooling channel, and flow-disturbing elements for disturbing a coolant flow in the cooling channel, the flow-disturbing elements projecting in a height direction in a projection-like manner from the cooling channel bottom. The invention further relates to a battery module having such a battery housing part, and to a method for producing such a battery housing part.

It is known to connect individual battery cells together to form a battery module. Battery modules can in turn be interconnected to form a battery system. Battery cells heat up as a result of chemical conversion processes, especially when power is delivered and consumed quickly. The more powerful the battery module, the greater the heating can become and the more important is the need for an effective cooling system. This is particularly due to the fact that the service life of a battery module decreases significantly at an operating temperature of more than approximately 40° C. Furthermore, it is important to achieve a temperature gradient that is as constant as possible from battery cell to battery cell.

In known systems, the temperature control of battery modules is achieved mainly by using a coolant in the form of a cooling liquid. The coolant is usually directed through cooling channels in the battery module. It is known from patent applications DE 10 2018 220 937 A1 and DE 10 2018 220 939 A1 that the cooling channel is closed with a covering means in an integrally bonded manner or is closed during the production of the battery housing. The covering means is preferably welded to a main body of the battery housing. In patent application DE 10 2018 220 937 A1, it is further described that so-called flow-disturbing elements can be formed in the cooling channel to increase the cooling channel area. During welding, process-related humps and unevennesses are produced in the region of the weld seam and are leveled again by a subsequent process such as brushing and/or milling over. Nevertheless, only limited evenness can be achieved in these regions and over the entire surface of the cover material. When the battery module is installed, the surface of the covering means serves as a support surface in the installation space. A certain degree of unevenness can be accepted here. However, the evenness that can be achieved by the welding as well as by the downstream process, viewed over the entire area of the covering means, is not sufficient for certain process steps in the manufacture of the battery system and in particular for the precise positioning of the battery housing in a height or Z direction.

A distance is required between the flow-disturbing elements and the covering means so that a sufficiently strong coolant flow can form between the covering means and the heads of the flow-disturbing elements. The smaller the distances between the covering means and the heads of the flow-disturbing elements, the greater the pressure loss in the coolant flow in the cooling channel. This must be prevented as far as possible. Due to the desired distance between the covering means and the flow-disturbing elements, this region in the cooling channel is not suitable for accommodating the battery housing in the workpiece carrier in known systems. When a force is applied in the Z direction, the covering means would not be adequately supported. This would result in deflection of the covering means. Such a force is generated, for example, when mounting a cell stack in the battery housing.

SUMMARY

In the context of the present invention, a system is now provided with which it is possible to position a battery housing of the type in question accurately in the manufacturing process of a battery module in a simple manner. In particular, a battery housing part, a battery module, and a method for producing a battery housing part according to the invention are proposed. Further embodiments of the invention are provided by the description and the figures. Here, features described in conjunction with the battery housing part of course also apply in conjunction with the battery module according to the invention, the method according to the invention, and vice versa in each case, and therefore reference is and/or can always be made mutually with regard to the disclosure concerning the individual aspects of the invention.

In accordance with a first aspect of the present invention, a battery housing part is provided for a battery housing of a battery module for accommodating battery cells. The battery housing part has a cooling channel with a cooling channel bottom, a cooling channel wall for delimiting the cooling channel, and flow-disturbing elements for disturbing and/or defining a coolant flow in the cooling channel. The flow-disturbing elements project in a height direction from the cooling channel bottom in a projection-like manner. Some of the flow-disturbing elements are designed in the form of normal elements. Another part of the flow-disturbing elements is designed in the form of supporting elements, the supporting elements being designed to be higher in the height direction than the normal elements in order to support a covering means covering the cooling channel.

In experiments within the scope of the present invention, it was found that by a targeted local increase of the flow-disturbing elements, not only a supporting structure for improved positioning of the battery housing part or a battery module with such a battery housing part can be achieved, but also pressure losses in the coolant flow can be prevented or at least kept at an acceptably low value. This means that, on the one hand, a sufficiently high support force can now be achieved in the workpiece carrier for assembly processes, and thus also the desired positioning accuracy of the battery housing or battery module in the workpiece carrier for subsequent processes such as the building of the battery. On the other hand, only a small and correspondingly permissible increase in a pressure loss in the coolant flow in the region of the support points or contact points between the flow-disturbing elements and the covering means of the battery housing in the workpiece carrier has to be accepted. In addition, the design of the battery housing part according to the invention can effectively prevent deformations of supporting elements when applying assembly forces in the Z direction during the assembly process for the battery module.

The battery module can be understood as a battery module with a plurality of battery cells for use in a motor vehicle. In particular, the battery module is configured in the form of or as part of a drive battery system for driving the motor vehicle, i.e. in the form of or as part of a high-voltage battery module. The battery housing part is configured accordingly for use in such a drive battery module. The battery housing part is thus configured in particular for use in electrochemical energy storage systems, preferably in lithium-ion battery modules and/or components thereof.

The normal elements and the supporting elements preferably have the same trunk. This means that up to a height of, for example, 50% of the height of the normal elements in the height direction, the trunk of the flow-disturbing elements is preferably identical or at least approximately identical. This results in a uniform flow pattern of the coolant through the cooling channel. In addition, this leads to a relatively simple manufacturing of the battery housing part.

The flow-disturbing elements preferably have a mean diameter in a range between 2 mm and 8 mm, in particular in a range between 3 mm and 5 mm. The normal elements and/or the supporting elements preferably each have a height in the height direction in a range between 2 mm and 8 mm, in particular in a range between 3 mm and 5 mm, the supporting elements being somewhat higher than the normal elements in accordance with the invention, so that the supporting elements contact the covering means in an assembled state of the battery housing, whereas a small spacing or a small gap is formed between an end face of the normal elements and the covering means. A spacing between the flow-disturbing elements is preferably in a range between 5 mm and 15 mm, in particular in a range between 9 mm and 11 mm.

With reference to the battery housing part, the cooling channel can be understood as an open cooling channel. Only in the finished battery housing and/or in the finished battery module, in which the covering means is mounted on the battery housing part, can the cooling channel be regarded as a closed cooling channel. The covering means can thus form part of the cooling channel in a battery housing and/or battery module or at least can be understood accordingly.

According to a further embodiment of the present invention, it is possible that a battery housing part comprises a plurality of supporting element groups, each having a plurality of supporting elements formed adjacently to each other, the supporting element groups being formed distanced from each other, with normal elements between the supporting element groups. By means of a grouped and/or locally delimited grouped arrangement of a plurality of supporting element groups, an increased stability for positioning the battery housing part and/or the covering means on the battery housing part can be achieved, while pressure losses in the coolant flow in the cooling channel can still be kept sufficiently low. The supporting element groups are preferably formed in corner regions of the cooling channel and/or the battery housing part. This means that there are preferably no or only a few, for example less than five, normal elements between a supporting element group and the nearest cooling channel wall along an imaginary straight line. It may thus be advisable, for example, to have four supporting element groups in four different corner regions of the cooling channel and/or distanced as far apart as possible. The size of each supporting element group or of a corresponding region, which is to serve later in the workpiece carrier as a support surface and/or reference surface for the covering means, is designed to be large enough so that no plastic deformation occurs on the covering means and/or on the flow-disturbing elements when the assembly forces are applied, as in the case, for example, of cell stack assembly and the welding of cell connectors. In other words, the end faces of the supporting elements can form a reference height that is used as a basis for positioning the battery housing part in the Z direction or height direction for all further steps in the building of the battery module. Each supporting element group can have between 3 and 15, in particular between 4 and 10 supporting elements. For example, a supporting element group may have 7 supporting elements, which together form a supporting element group with a circular or hexagonal contact face for the holding means.

Furthermore, it is possible for the flow-disturbing elements in a battery housing part according to the present invention to be provided in the form of pins and/or pegs. Such a form gives the coolant a high flow clearance. Furthermore, the effective coolant area can thus be significantly increased without having to accept excessive pressure losses in the coolant flow. Furthermore, such a pin and/or peg form is easy to manufacture.

In addition, it is possible in a battery housing part according to the invention for a flat bearing plateau to be formed on one end face of each of the supporting elements at a distance from the cooling channel bottom. The bearing plateau can be understood as a bearing face which preferably has an area in a range between 4 $mm^2$ and 25 $mm^2$, in particular in a range between 10 $mm^2$ and 20 $mm^2$. Thus, each bearing plateau may have a diameter of, for example, 4 mm or a length and/or width of 4 mm. The bearing plateau preferably has a circular cross-section, but may also have an angular cross-section. The bearing plateau can be used to achieve a two-dimensional force distribution on the supporting element. Damage to the covering means, caused for example by too sharp a bearing contact, can be prevented.

In addition, in a battery housing part according to the present invention, it is possible for the flow-disturbing elements to taper conically and/or concavely away from the cooling channel bottom. In this way, the flow-disturbing elements in the cooling channel can be designed to be stable and yet as low-resistance as possible, i.e. to achieve the lowest possible pressure loss in the coolant flow.

The supporting elements of a battery housing part according to the invention are preferably higher than the normal elements in the height direction in a range between 0.2 mm and 1 mm. The normal elements thus have almost the same height as the supporting elements and/or the cooling channel wall. This allows the normal elements to form the largest possible cooling area for cooling the coolant in the cooling channel. At the same time, the reduced height is sufficient to keep a pressure loss in the coolant flow as low as possible. The height difference is particularly preferably in a range between 0.4 mm and 0.8 mm.

According to a further variant of the present invention, it is possible that in a battery housing part the supporting elements have the same height as the cooling channel wall in the height direction starting from the cooling channel bottom. Thus, the supporting elements and the cooling channel wall can jointly serve as a reference surface and/or reference height for orienting the battery housing part. In this way, the desired orientation of the battery housing part or the battery housing can be carried out easily and accurately during assembly.

Furthermore, in a battery housing part according to the present invention, it is possible for the cooling channel, including the cooling channel bottom, the cooling channel wall and the flow-disturbing elements, to be formed in one piece and/or monolithically. In this way, the battery housing part is provided in a particularly simple and, moreover, robust manner. The battery housing part can in particular be designed as a cast body, preferably as a cast metal body, and particularly preferably as a die-cast aluminum body.

Another aspect of the present invention relates to a battery module having a battery housing part as described above, a plurality of battery cells arranged in the battery housing part, and a covering means for covering the cooling channel, the covering means being welded to the cooling channel wall and is distanced from the normal elements. Thus, the battery module according to the invention brings the same advantages as have been described in detail with reference to the battery housing part according to the invention. In the battery module, the covering means can be considered as part of the cooling channel. That is to say, the cooling channel can also be understood to comprise the covering means. The distance between the covering means and the normal elements is preferably in a range between 0.2 mm and 1 mm and/or corresponds to the height difference between the normal element and the supporting element.

Furthermore, an aspect of the present invention relates to a method for producing a battery housing part as described above. The method comprises the following steps:

providing a housing main body having a cooling channel with a cooling channel bottom, a cooling channel wall for delimiting the cooling channel, and flow-disturbing elements for disturbing a coolant flow in the cooling channel, the flow-disturbing elements projecting in a height direction in a projection-like manner from the cooling channel bottom, a part of the flow-disturbing elements being designed in the form of normal elements, another part of the flow-disturbing elements being designed in the form of supporting elements or in the form of superelevated supporting elements, and the supporting elements being designed to be higher than the normal elements in the height direction and, starting from the cooling channel bottom, higher than the cooling channel wall, and removing end portions of the various supporting elements or superelevated supporting elements so that the height of the superelevated supporting elements, in order to support a covering means for covering the cooling channel, is equal to the height of the cooling channel wall in the height direction or changes accordingly.

Thus, the method according to the invention also brings the advantages described above. The trunk of the flow-disturbing elements is in each case identical or at least approximately identical to one another. The supporting elements of the housing main body initially differ from the normal elements of the housing main body only in height. Once the end portions have been removed, the supporting elements of the battery housing part also differ from the various normal elements of the battery housing part in the shape of the end face. The trunk remains identical or approximately identical. The supporting elements of the housing main body can be understood as superelevated supporting elements, while the supporting elements of the finished battery housing part or the supporting elements after the removal of the end portions of the superelevated supporting elements can be described as shortened supporting elements which, however, continue to be higher than the normal elements. The removal is preferably carried out by mechanical machining, in particular by milling over the superelevated supporting elements. In particular, this removes a previously possible radius at the end portions, resulting in a larger flat bearing surface or bearing plateau compared to the initial state after casting of the housing main body. In order to achieve the most uniform height possible of the cooling channel wall as well as of the supporting elements, the superelevated supporting elements and the cooling channel wall can be removed and/or milled over together and/or simultaneously with the same height. During production of the housing main body, the superelevated supporting elements are also formed during a possible die casting process. For the service life of the die-casting mold, it is advantageous if the supporting elements are or will be formed with sufficiently large radii and/or sufficiently large draft angles. As soon as the end portions have been removed, the covering means can be connected in an integrally bonded manner to the cooling channel wall, in particular welded, and preferably connected in an integrally bonded manner by means of a friction stir welding process.

BRIEF DESCRIPTION OF THE DRAWINGS

Further measures improving the invention will become apparent from the following description of various exemplary embodiments of the invention, which are shown schematically in the figures. All features and/or advantages arising from the claims, the description or the figures, including structural details and spatial arrangements, may be essential to the invention both individually and in the various combinations.

In the figures, schematically in each case.

DETAILED DESCRIPTION

Elements with the same function and mode of operation are each provided with the same reference signs in the figures.

Figure 1:
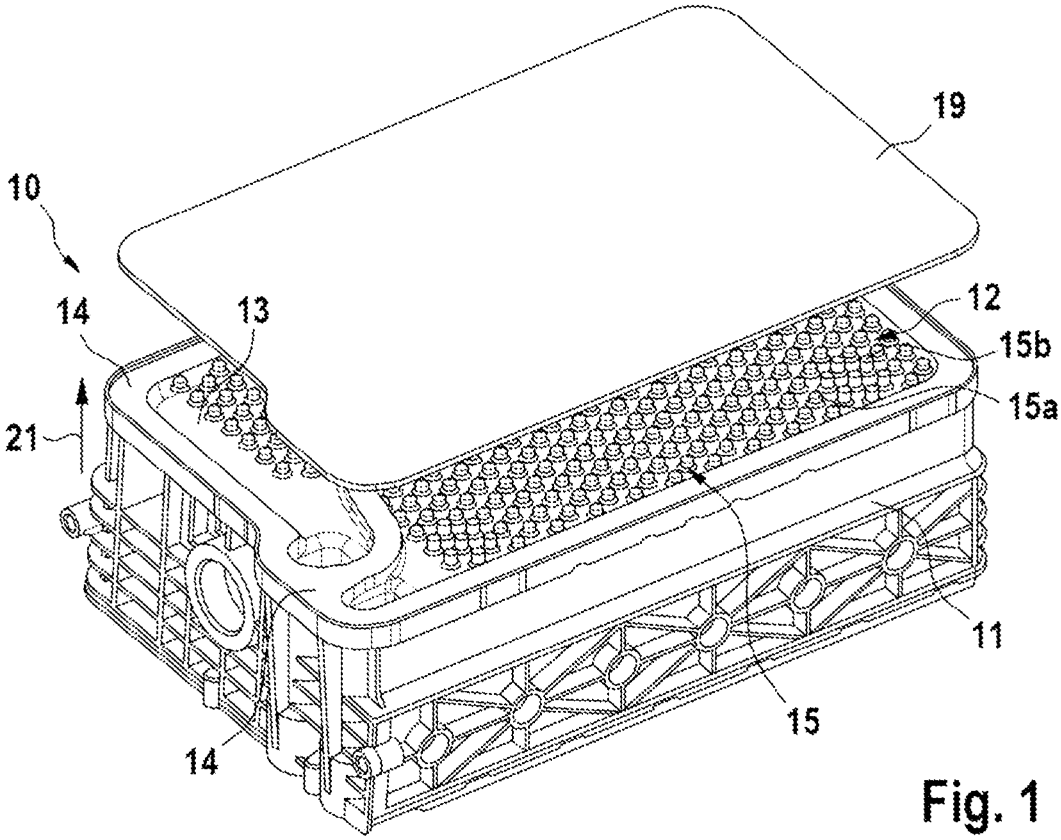
FIG. 1 shows a battery housing part with a covering means to be attached thereto according to a preferred embodiment of the present invention.
Figure 7:
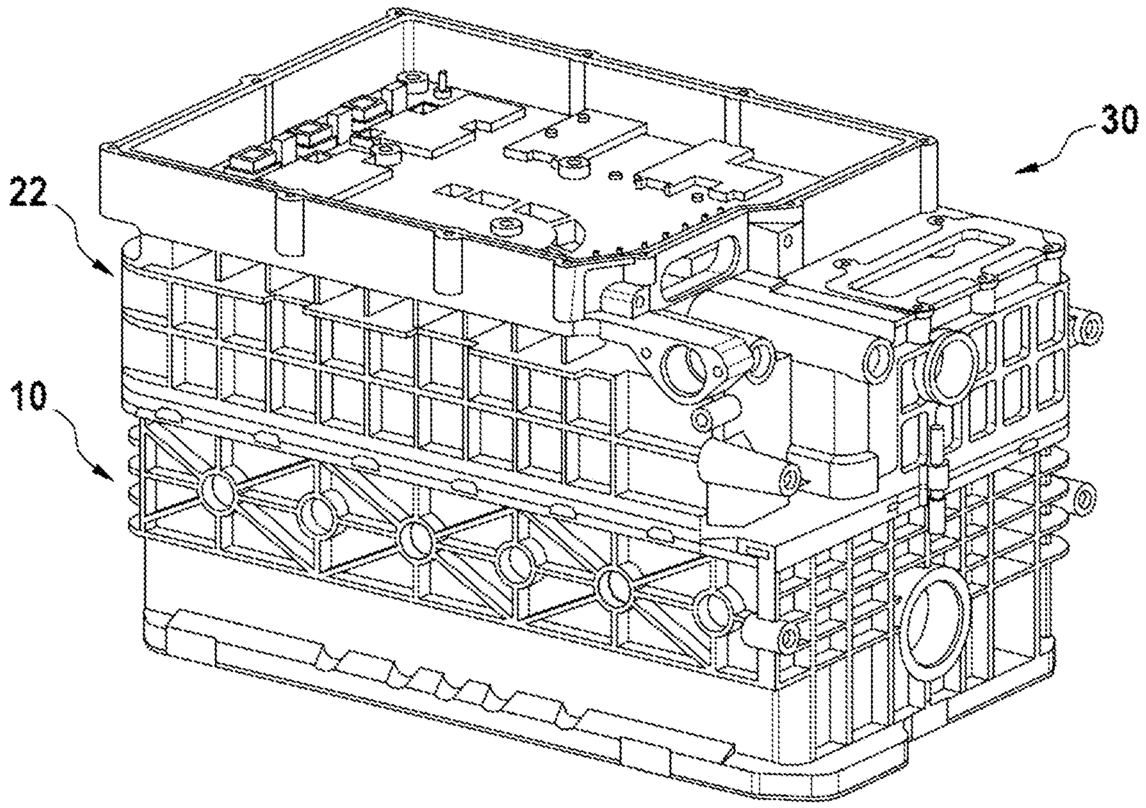
FIG. 7 shows a battery module with a battery housing part according to the preferred embodiment of the invention.

FIG. 1 shows a battery housing part 11 for a battery housing 10 of a battery module 30, shown in FIG. 7, for accommodating battery cells. The battery housing part 11 is formed in one piece in the form of a die-cast aluminum component and comprises a cooling channel 12 with a cooling channel bottom 13, a cooling channel wall 14 for delimiting the cooling channel 12, and flow-disturbing elements 15 in the form of pins or pegs for disturbing or defining a coolant flow in the cooling channel 12. The flow-disturbing elements 15 project in a height direction 21 in a projection-like manner from the cooling channel bottom 13. As shown in FIG. 1, the flow-disturbing elements 15 are formed partly as normal elements **15*a* and partly as supporting elements 15*b*. To support a covering means (member) 19 covering the cooling channel 12, the supporting elements 15*b* are designed to be higher than the normal elements 15*a* in the height direction 21. More specifically, the supporting elements 15*b* shown are designed to be higher than the normal elements 15*a* in the height direction 21 by about 0.5 mm. In an assembled state of the battery housing 10, the covering means 19 for covering the cooling channel 12 is welded to the cooling channel wall 14, contacts the supporting elements 15*b*, and is distanced from the normal elements 15*a***.

Figure 2:
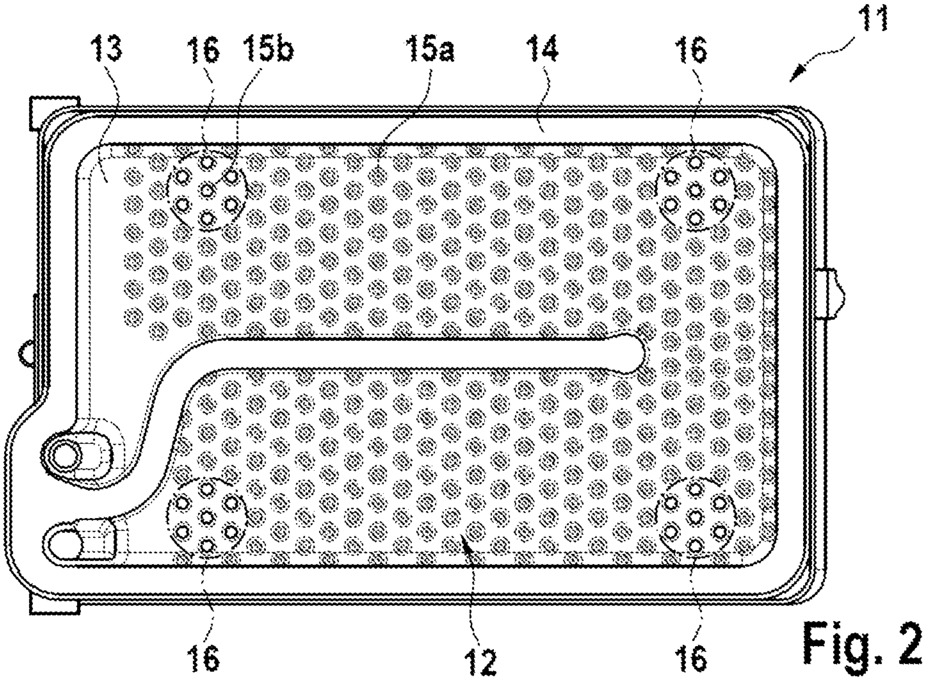
FIG. 2 shows the battery housing part according to the preferred embodiment in a plan view.

As shown in FIG. 2, the supporting elements **15*b* are provided in four supporting element groups 16. Each supporting element group 16 has seven supporting elements 15***b* formed adjacently to each other. The supporting element groups 16 are circular or hexagonal in plan view. The supporting element groups 16 are formed in each case with normal elements 15*a* between the supporting element groups 16, distanced from one another in four corner regions of the cooling channel 12.

Figure 3:
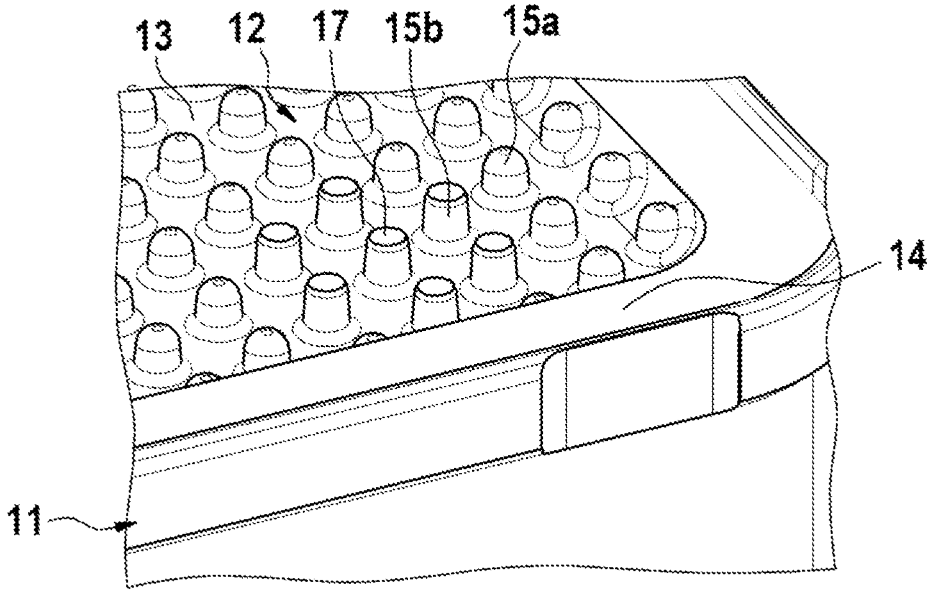
FIG. 3 shows the battery housing part according to the preferred embodiment in a detailed view.
Figure 4:
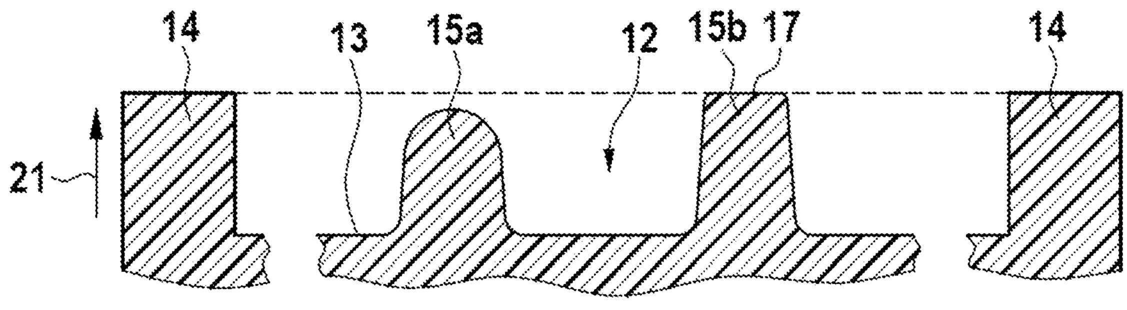
FIG. 4 shows a sectional view showing a detail according to the invention.

FIG. 3 shows the battery housing part 11 in further detail. Looking at FIG. 3, it can be seen in particular that a flat bearing plateau 17 is formed on one end face of the supporting elements 15*b* at a distance from the cooling channel bottom 13 in each case. In addition, it can be recognized that the flow-disturbing elements 15 taper away from the cooling channel bottom 13 conically, or away from the cooling channel bottom 13 initially concavely and conically. In the cross-section according to FIG. 4, the difference in height between a supporting element 15*b* and a normal element 15 can be seen. In addition, it can be seen there that the supporting elements 15*b* have the same height as the cooling channel wall 14 in the height direction 21 starting from the cooling channel bottom 13.

Figure 5:
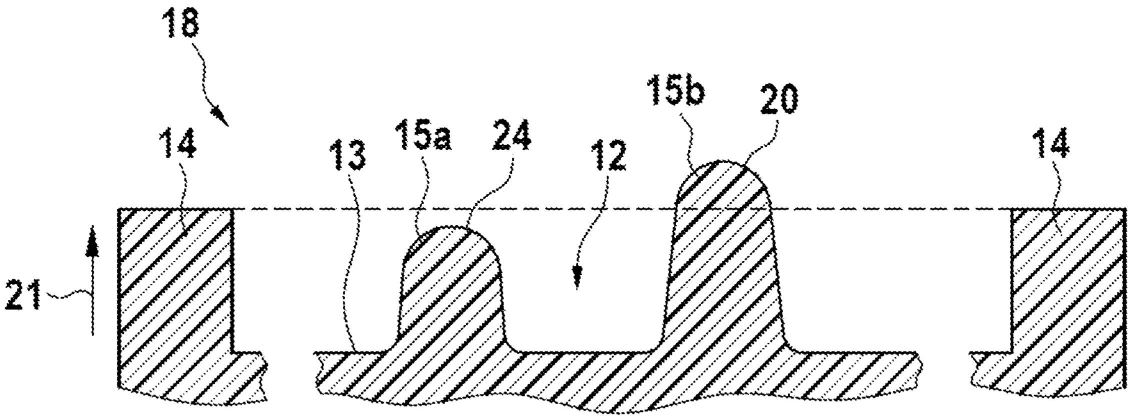
FIGS. 5 and 6 show illustrations for explaining a method according to the invention.
Figure 6:
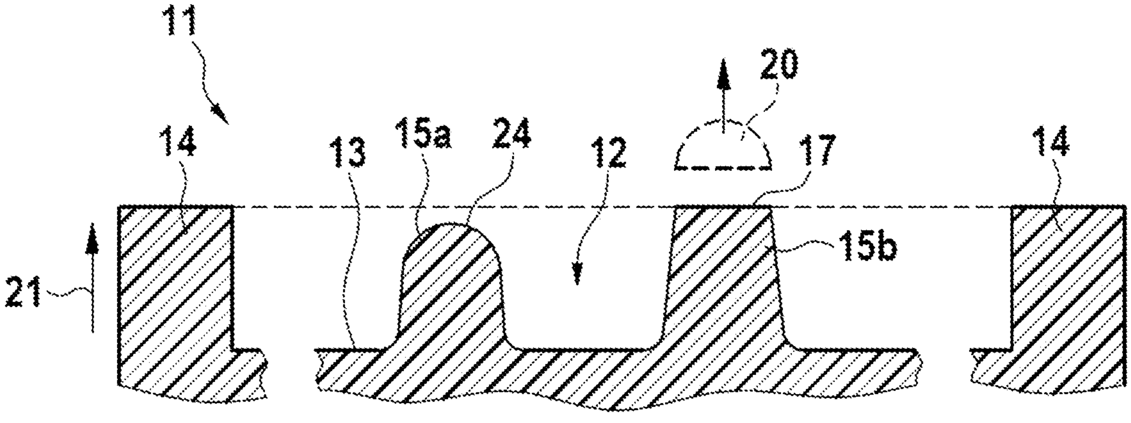

With reference to FIGS. 5 and 6, a method for producing a battery housing part 11 as described above is then explained. As shown in FIG. 5, the housing main body 18 is first provided for this purpose. The housing main body 18 has a cooling channel 12 with a cooling channel bottom 13, a cooling channel wall 14 for delimiting the cooling channel 12, and flow-disturbing elements 15 in the form of normal elements 15*a* and supporting elements 15*b* or supporting elements 15*b* which are initially still superelevated. The supporting elements 15*b* are or will be higher than the normal elements 15*a* in the height direction 21 and, starting from the cooling channel bottom 13, also higher than the cooling channel wall 14. As shown in FIG. 6, in order to produce the desired battery housing part 11, the end portions 20 of the various supporting elements 15*b* are then removed, in particular milled off, in such a way that the height of the supporting elements 15*b*, in order to support the covering means 19 for covering the cooling channel 12, in the height direction 21 is equal to the height of the cooling channel wall 14. However, the shortened supporting elements 15*b* are still higher than the normal elements 15*a*.

FIG. 7 illustrates a battery module 30 with a battery housing part 11 as described above. The battery module 30 has an electronics housing 22 for accommodating electronics components and the battery housing 10 for accommodating a plurality of battery cells.

The invention permits further design principles in addition to the embodiments illustrated. That is to say, the invention is not to be considered as limited to the exemplary embodiments explained with reference to the figures.

What is claimed is:

1. A method for producing a battery housing part (11), the method comprising the steps of:

-providing a housing main body (18) having the battery housing part (11), the battery housing part (11) having a cooling channel (12) with a cooling channel bottom (13), a cooling channel wall (14) for delimiting the cooling channel (12), and flow-disturbing elements (15) for disturbing a coolant flow in the cooling channel (12), the flow-disturbing elements (15) projecting in a height direction (21) in a projection-like manner from the cooling channel bottom (13), wherein a part of the flow-disturbing elements (15) is configured in a form of normal elements (15*a*) and another part of the flow-disturbing elements (15) is configured in a form of supporting elements (15*b*), the supporting elements (15*b*) being configured to be higher than the normal elements (15*a*) in the height direction (21), and the supporting elements (15*b*) configured to be higher than the cooling channel wall (14) in the height direction (21), and removing end portions (20) of the supporting elements (15*b*) so that the height of the supporting elements (15*b*), in order to support a covering member (19) for covering the cooling channel (12), is equal to the height of the cooling channel wall (14) in the height direction (21).

2. The method according to claim 1, wherein the step of removing end portions (20) of the supporting elements (15*b*) results in forming a flat bearing plateau (17) on one end face of each of the supporting elements (15*b*) at a distance from the cooling channel bottom (13).

3. The method according to claim 1, wherein the supporting elements (15*b*) are higher than the normal elements (15*a*) in the height direction (21) in a range between 0.2 mm and 1 mm.

4. The method according to claim 1, further comprising arranging a plurality of battery cells in the battery housing part (11);

arranging the covering member (19) for covering the cooling channel (12); and welding the covering member (19) to the cooling channel wall (14), the covering member (19) distanced from the normal elements (15*a*).

* * * * *